United States Patent [19]

Olsen et al.

[11] Patent Number: 5,770,331
[45] Date of Patent: Jun. 23, 1998

[54] RADIATION CURABLE FRAME FOR STACKED CELL CONSTRUCTION AND FOR EDGE SEALING OF ELECTROLYTIC CELLS TO RETARD DENDRITIC SHORT-CIRCUITS

[75] Inventors: Ib I. Olsen; Russell D. Moulton, both of San Jose; Benjamin Chaloner-Gill, Santa Clara; James Buckley, Cupertino, all of Calif.; Neal Golovin, Owings Mills, Md.; Douglas J. Payne, San Jose, Calif.

[73] Assignee: Valence Technology, Inc., Henderson, Nev.

[21] Appl. No.: 727,176

[22] Filed: Sep. 20, 1996

Related U.S. Application Data

[63] Continuation of Ser. No. 230,181, Apr. 20, 1994, abandoned.

[51] Int. Cl.$^6$ ..................................................... H01M 10/36
[52] U.S. Cl. .......................... 429/162; 429/153; 429/159; 429/192; 429/254
[58] Field of Search ..................................... 429/162, 153, 429/159, 254, 185, 192

[56] References Cited

U.S. PATENT DOCUMENTS

| | | |
|---|---|---|
| 2,727,079 | 12/1955 | Chubb et al. . |
| 3,784,414 | 1/1974 | Macaulay et al. . |
| 4,194,061 | 3/1980 | Land et al. ............................ 429/153 X |
| 4,621,035 | 11/1986 | Bruder ................................. 429/162 X |
| 4,997,732 | 3/1991 | Austin et al. ............................ 429/153 |
| 5,562,741 | 10/1996 | Meadows et al. ................... 429/185 X |

FOREIGN PATENT DOCUMENTS

| | | |
|---|---|---|
| 2304188 | 10/1976 | France . |
| 2321199 | 3/1977 | France . |
| 57-084561 | 8/1982 | Japan . |
| 57187861 | 2/1983 | Japan . |
| 62211867 | 3/1988 | Japan . |
| 423165 | 2/1935 | United Kingdom . |
| WO8704011 | 7/1987 | WIPO . |

*Primary Examiner*—John S. Maples
*Attorney, Agent, or Firm*—James Hsue

[57] ABSTRACT

A new technique for securing into place a plurality of layers which make a battery body, and for preventing electrical short-circuits within the battery by retarding the formation of dendritic growths is disclosed. A radiation curable layer of material is coated onto a portion of at least one outwardly exposed face of a battery body, whereupon the layer of material is then cured. The cured layer of material is positioned relative to the body such that the cured layer provides support to the body in a manner to secure in place a plurality of layers which make up the battery body, thereby ensuring proper electrical contact between the plurality of layers. In addition, the cured layer of material is also positioned such that the cured layer inhibits formation of short circuiting electrical paths between the anode and cathode layers of the battery, the paths being caused by formation of dendritic growths extending out from the anode layer towards the cathode layer.

28 Claims, 3 Drawing Sheets

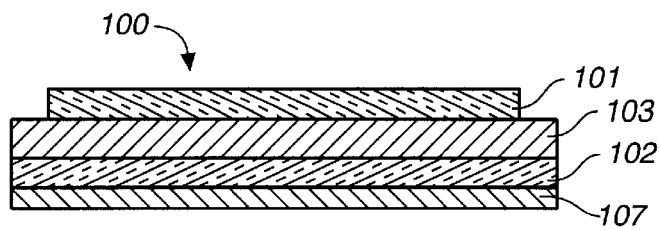
FIG._1A
*(PRIOR ART)*
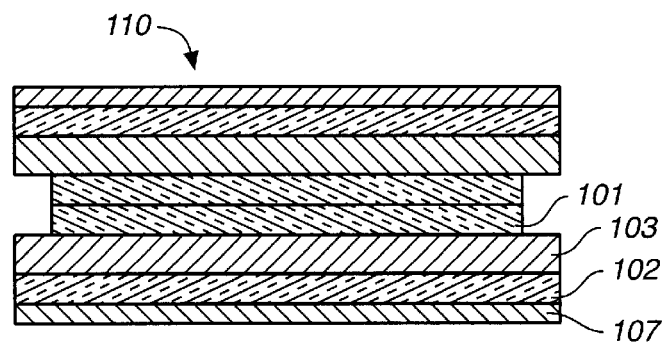
FIG._1B
*(PRIOR ART)*
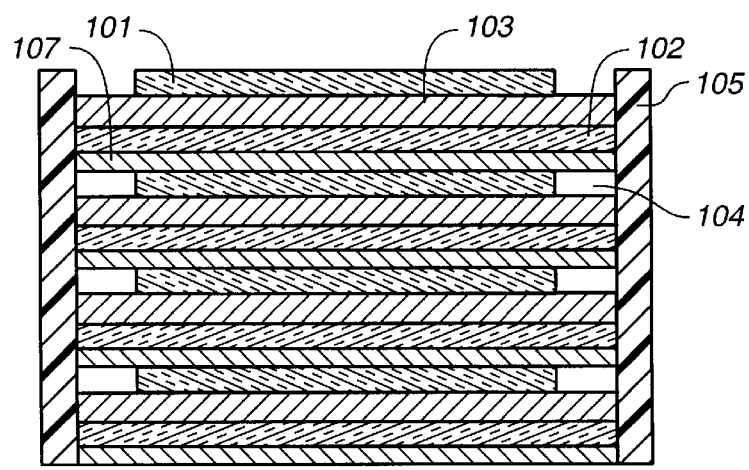
FIG._2
*(PRIOR ART)*

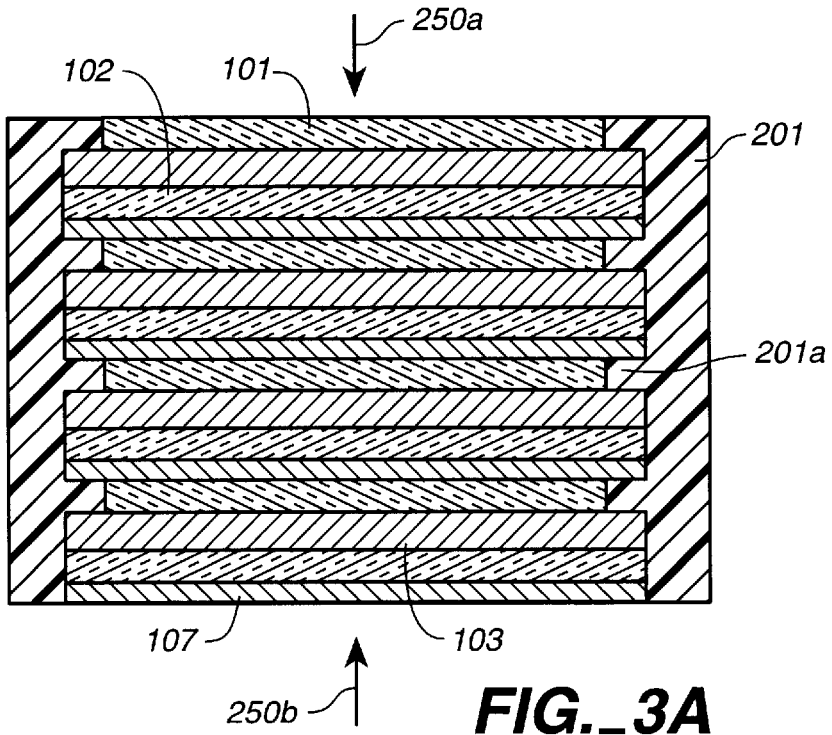
FIG._3A
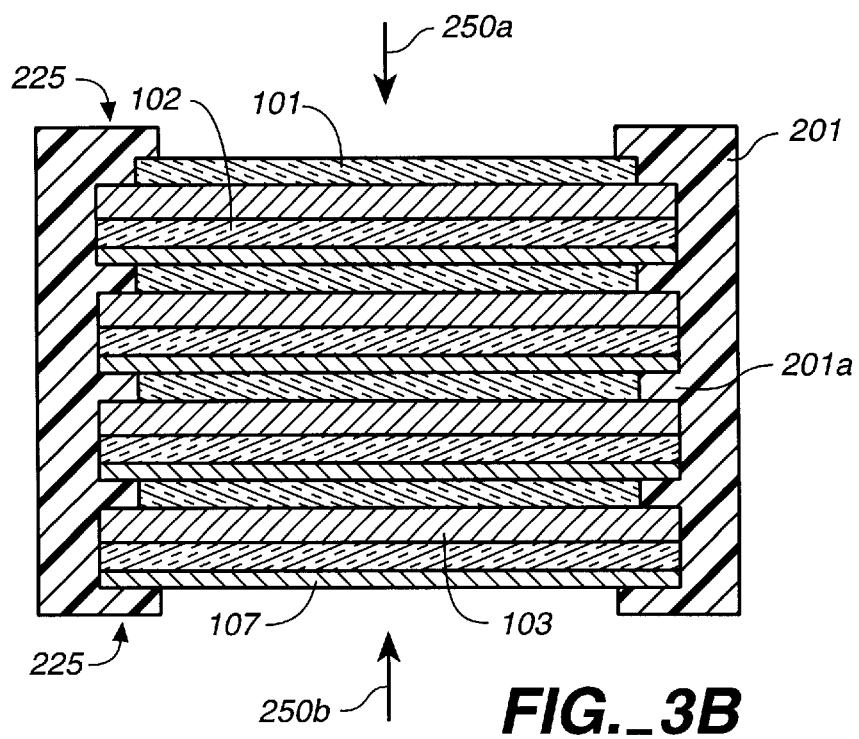
FIG._3B

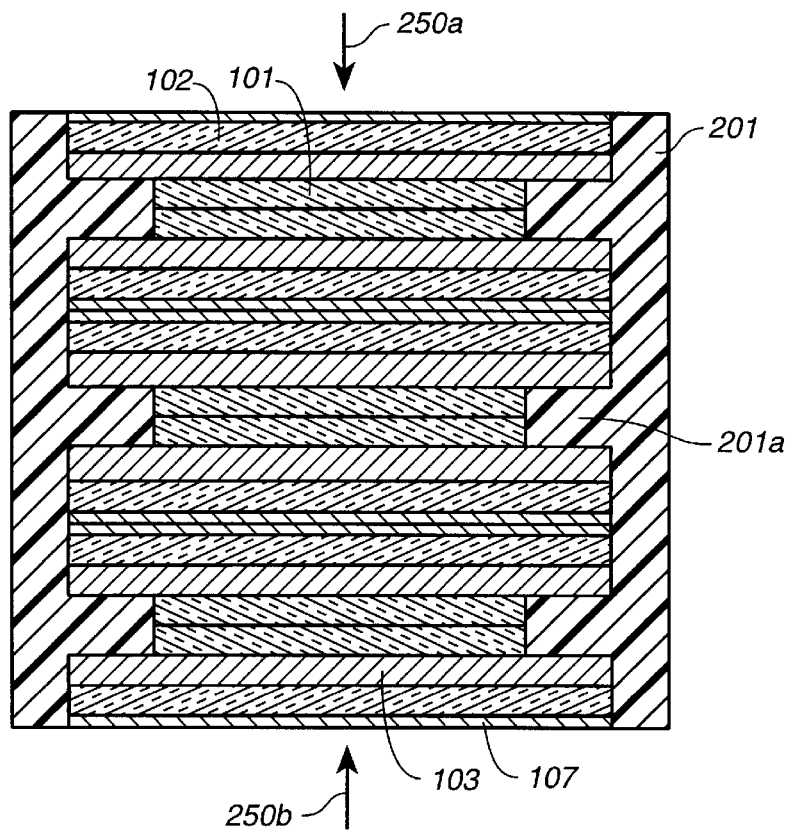
FIG._4A
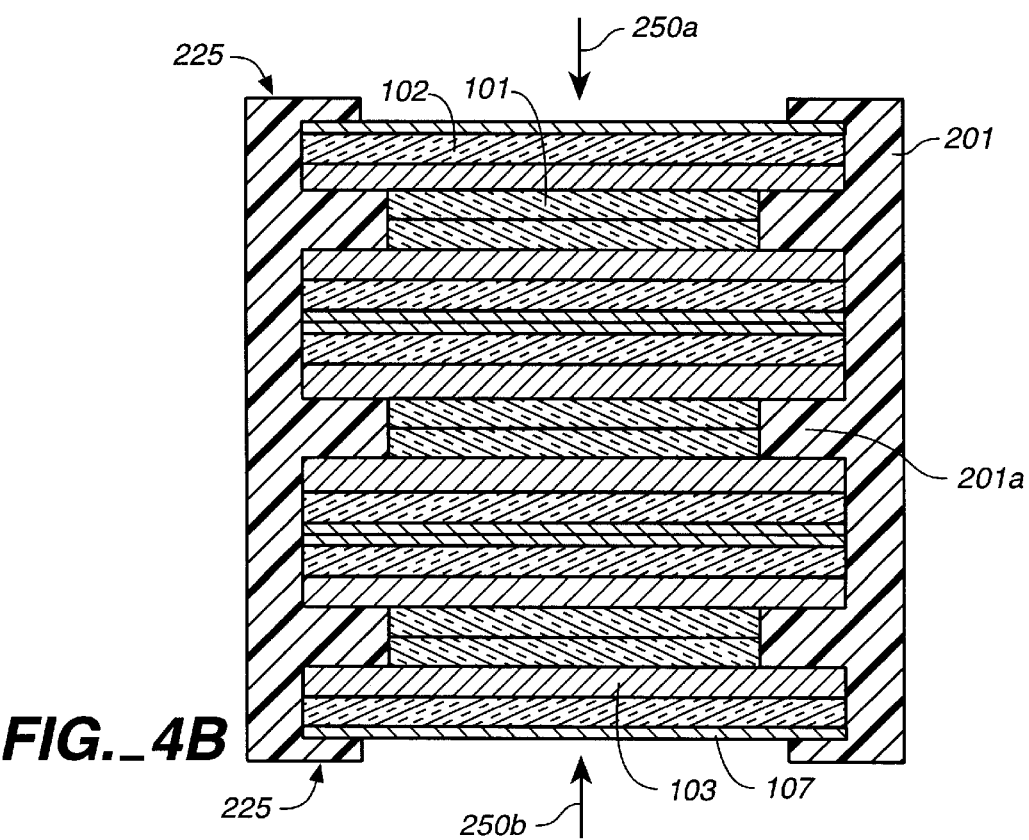
FIG._4B

RADIATION CURABLE FRAME FOR STACKED CELL CONSTRUCTION AND FOR EDGE SEALING OF ELECTROLYTIC CELLS TO RETARD DENDRITIC SHORT-CIRCUITS

This is a continuation of application Ser. No. 08/230,181, filed Apr. 20, 1994, now abandoned.

BACKGROUND OF THE INVENTION

The present invention relates to the design of battery assemblies, and more particularly to (1) a radiation curable frame for stacked cell construction, and (2) to edge sealing of electrolytic cells to retard dendritic short-circuits.

Presently there is a high level of interest in industry in designing thin layer solid state batteries. Such batteries are used in lap-top computers and other portable electronic devices. One particular type of thin layer solid state battery which is widely used is the rechargeable lithium anode cell. An example of a conventional lithium flat cell battery is described in U.S. Pat. No. 4,997,732 to Austin, et al. ("Austin"), which is incorporated herein by reference in its entirety. The lithium anode cell comprises a lithium anode layer, a transition metal oxide polymer composite cathode layer, and a solid or liquid electrolyte which includes a dissolved salt. Where the anode employed is made of lithium, the electrolyte would include a lithium salt. Batteries with anodes made of metals other than lithium, such as magnesium, have also been proposed.

Two conventional stacked cell rechargeable batteries are shown in FIGS. 1A and 1B. Each battery comprises an anode layer 101, a cathode layer 102, an electrolyte layer 103, and a current collector layer 107. The basic group of layers used to make a stacked single-cell battery is shown in FIG. 1A. Collectively, the layers used to make a stacked single-cell battery are referred to as body 100. The basic group of layers used to make a stacked bi-cell battery is shown in FIG. 1B. Collectively, the layers used to make a stacked bicell battery are referred to as body 110. For convenience purposes, reference numbers for those elements which are common to each of the figures will remain the same.

As known to those skilled in the art, anode layer 101 is typically smaller in size than either cathode layer 102 or electrolyte layer 103. Therefore, when the individual layers are stacked to form a flat cell battery as shown in FIG. 2, inlets 104 are formed as a result of the differing sizes of the anode, cathode and electrolyte layers. In addition, when multiple cells based on lithium polymer electrolyte laminate are stacked on top of each other to form a battery (as shown in FIG. 2, for example), each of the layers must be secured in place relative to the other layers.

One such technique for securing the various layers 100 in place is to wrap the stack of layers in tape. However, this results in deformation of the stack, particularly along the edges of the battery where inlets 104 exist, which, in turn, results in poor battery performance.

Another technique for securing layers 100 is to incorporate rigid frame walls along the edges of the battery layers, and then wrapping the frame walls and layers 100 in tape. Such walls are illustrated in FIG. 2 as items 105. Walls 105 are useful for securing cathode layer 102 and electrolyte layer 103, but, as illustrated in FIG. 2, the walls do not contact anode layer 101. This is problematic since it results in anode layer 101 being able to shift positions, which makes the stack 100 difficult to handle during assembly. Additionally, the shifting of the anode layer can result in decreased battery performance. Furthermore, walls 105 are typically made of a thermoplastic polymer such as polyethylene or polypropylene, which means walls 105 are susceptible to softening at elevated temperatures, making this type of frame undesirable for high temperature applications. Lastly, each of the walls 105 typically has a thickness of about 2 millimeters. This thickness adds to the overall dimensions of the battery, which, in turn, decreases the efficiency of space used within the battery since much of the space occupied by the frame could otherwise be used for electro-chemical storage. Thus, in situations where a conventional frame (such as that shown in FIG. 2) is added without increasing the overall dimensions of the battery, a portion of the space otherwise used for electrochemical storage will be occupied by the frame, resulting in reduced battery life.

It is therefore an objective of the present invention to provide a new frame for securing into place the various stacked layers of a flat cell battery that avoids the problems of the techniques discussed above. Specifically, one objective of the present invention is to provide a frame for a flat stack cell battery which contacts and secures into place each of the layers of the cell. A second objective of the present invention is to provide a frame which does not result in deformation of the edges of the stack of layers. A third objective of the present invention is to provide a frame which has a thickness of not more than 5 millimeters.

Another common problem associated with the lithium-anode battery, and, indeed, other rechargeable batteries as well, is the formation of dendritic growths during battery recharging. During replating of the anode (i.e. during battery recharging) in most rechargeable batteries, dendrites of anode material slowly grow out from the outer edges of the anode toward the edges of the cathode or current collector layers where there is no solid electrolyte coating. In this way, the anode dendrites by-pass the protective coating of the solid electrolyte layer and cause a short circuit to occur when the dendrite contacts the edge of either the cathode or current collector layer. This, in turn, causes the premature demise of the electrolytic rechargeable cell or stack of cells.

It is therefore an additional objective of the present invention to provide a technique for the retardation of dendritic growths which slowly grow out from the anode during replating of a rechargeable battery towards the edges of the cathode or current collector layers of the battery. In accordance with this objective, a further objective of the present invention is to extend or increase the cycle life, capacity, energy density, and rate capability of the rechargeable battery.

SUMMARY OF THE INVENTION

These and additional objectives are accomplished by the various aspects of the present invention, wherein, briefly, according to a principal aspect, a radiation curable layer of material is coated onto a portion of at least one outwardly exposed face of a battery body, whereupon the layer of material is then cured. The cured layer of material is positioned relative to the body such that the cured layer provides support to the body in a manner to secure in place a plurality of layers (e.g. anode, cathode, electrolyte, current collector, etc.) which make up the body, thereby ensuring proper electrical contact between the plurality of layers. In addition, the cured layer of material is also positioned such that the cured layer inhibits formation of short circuiting electrical paths between the anode and cathode layers of the battery, the paths being caused by formation of dendritic growths extending out from the anode layer towards the cathode layer. Thus, in accordance with this principal aspect, the present invention functions as both (1) a battery frame for securing into place the plurality of layers which make the battery body, and/or (2) a barrier layer for preventing electrical short-circuits within the battery by retarding the formation of dendritic growths. These two different aspects of the present invention will, herein, each be discussed in greater detail separately.

A first main aspect of the present invention is directed to a new technique for securing into place the various layers of a flat cell battery, wherein at least a portion of a body of the flat cell battery is encased in a radiation cured frame such that the frame provides support to the body in a manner to secure in place a plurality of layers in the body, thereby insuring good electrical contact between the various layers of the cell.

Related to this first main aspect, another aspect of the invention is directed to a method for making a radiation curable frame for a stackable cell battery comprising the steps of applying a radiation curable material onto at least a portion of the battery body, and curing the material to thereby form a cured frame which encases at least a portion of the cell body and provides support to the cell body in a manner to secure in place the various stacked layers in the body.

The radiation curable frame of the present invention has several advantages over conventional -stacked cell frames. First, the frame of the present invention is thinner than conventional stacked cell frames. Second, the frame of the present invention is easier and faster to manufacture than conventional stacked cell frames. Third, the frame of the present invention retains its shape even when exposed to high temperatures. Fourth, the frame of the present invention can be easily marked for identification purposes. Lastly, the frame of the present invention can be made to be any color (except for black when U.V. curing).

A second main aspect of the present invention is directed to a new technique for retarding dendritic growths extending from a rechargeable battery anode, wherein a barrier is placed in contact with a portion of at least one outwardly exposed face of the battery body such that the barrier retards the formation of dendritic growths extending out from the battery anode. In accordance with this principal aspect, the outwardly exposed faces of a stack of multiple electrolytic rechargeable cells are sealed by a radiation curable barrier layer, or by a natural or synthetic rubber barrier layer which retards the formation of dendritic growths extending out from the battery anode.

Related to this second main aspect, another aspect of the present invention is directed to a method for retarding dendritic growths in a rechargeable battery comprising the steps of applying a rubber dissolved in a low boiling alkane solvent onto at least a portion of at least one outwardly exposed face of the battery body. The cast film is dried and the resulting thin film of rubber is left along the portion of at least one outwardly exposed face of the battery body. The thin film of rubber which remains will form a barrier which retards the formation of dendritic growths within the battery.

The technique of forming a rubber or radiation cured barrier layer on the outwardly exposed faces of a rechargeable battery has several advantages in addition to the advantage of retarding dendritic growths which extend from the anode. For example, the rubber or radiation cured residue around the outwardly exposed faces of the battery stack will act as an intermediate frame to hold each cell of the stack in place and to prevent each cell from slipping when handled.

In addition, the technique of the present invention can be used to replace mylar masking layers which are used in most rechargeable batteries to prevent inadvertent short circuiting of the battery cell layers at the edges. Since the barrier of the present invention also prevents inadvertent short circuiting of the battery cell layers at the edges, the mylar mask layer is not needed. This allows for more active surface area in the battery, which increases the life cycle, capacity, energy density, and rate capability of the battery. In addition, the high current density areas which typically occur near the edges of the mylar mask in conventional batteries are reduced using the technique of the present invention.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1A shows a basic group of layers used in making a stacked single-cell rechargeable battery.

FIG. 1B shows the basic group of layers used in making a stacked bi-cell rechargeable battery.

FIG. 2 shows a cross-sectional view of a conventional multi-layer stacked single-cell battery and frame.

FIG. 3A shows a cross-sectional view of a multi-layer stacked single cell rechargeable having sealed outwardly exposed faces in accordance with the technique of the present invention.

FIG. 3B shows an alternate embodiment of the barrier layer 201 of FIG. 3A.

FIG. 4A shows a cross-sectional view of a multi-layer stacked bi-cell battery having sealed outwardly exposed faces in accordance with the technique of the present invention.

FIG. 4B shows an alternate embodiment of the barrier layer 201 of FIG. 4A.

DETAILED DESCRIPTION OF THE PREFERRED EMBODIMENT

As stated previously, the present invention functions as both (1) a battery frame for securing into place the plurality of layers which make the battery body, and/or (2) a barrier layer for preventing electrical short-circuits within the battery by retarding the formation of dendritic growths. These two different aspects of the present invention will, herein, each be discussed in greater detail separately in order to better explain the different embodiments of the present invention.

Note that although FIGS. 3A, 3B, 4A, 4B will be described in detail with respect to each embodiment, the composition of barrier layer or frame 201 may change, depending upon each particular embodiment being described. For each embodiment described, however, the inventive concept of layer 201 remains the same—that is layer 201 can function as either (1) a battery frame for securing into place the plurality of layers which make the battery body; or (2) a barrier layer for preventing electrical short-circuits within the battery by retarding the formation of dendritic growths; or both (1) and (2).

Note also that as used herein, the term "battery" may include a single cell, or a plurality of cells, connected in either series and/or parallel fashion to furnish electrical current. The term "cell" includes an anode layer, cathode layer, electrolyte layer, and a pair of electrically conductive terminals, or a plurality of these layers connected in bi-faced, bi-polar, or other cell configuration designs known to those skilled in the art. The term "body" includes at least one anode layer, at least one cathode layer, and at least one electrolyte layer stacked together to form a single-cell or bi-cell battery.

RADIATION CURABLE FRAME FOR STACKED CELL CONSTRUCTION

FIGS. 3A, 3B, 4A and 4B illustrate alternate embodiments of the radiation curable frame 201 of the present invention. The illustrations of FIGS. 3A and 3B represent alternate embodiments of a cross-sectional view of a stacked single-cell battery. The illustrations of FIGS. 4A and 4B represent alternate embodiments of a cross-sectional view of a stacked bi-cell battery. The frame 201 is made out of a radiation curable material or a thermoset plastic which is applied directly onto the battery body (comprising layers 101, 102, 103, and 107) after the various layers of the body have been assembled. A more detailed description of the technique for making the radiation curable frame of the present invention is discussed immediately below.

The layers 101, 102, 103, and 107 of the battery body are first stacked to form a single or bi-cell, as described in the Background of the Invention. Pressure is then applied perpendicular to the battery layers, for example along arrows 250a and 250b, to compress the layers together while, simultaneously, a radiation curable mixture is applied to at least a portion of the body as indicated in FIGS. 3A, 3B, 4A, and 4B. The application of the mixture may be either by spray, brush, roller coating, syringe, or by dipping or immersing the body or portion thereof into the mixture. The mixture is then cured (or cross-linked) using actinic radiation.

The term "actinic radiation" as used herein includes the entire electromagnetic spectrum and electron beam radiation. It is anticipated, however, based on availability of radiation sources and simplicity of equipment that electron beam and ultraviolet (UV) radiation will be used most often. Electron beam radiation is advantageous because it does not require the presence of a photoinitiator. When a photoinitiator is required, for example when using UV radiation, initiators selected from among conventional photoinitiators may be used. Using UV light, the curing process takes about one to thirty seconds. By adding a suitable catalyst to the mixture, such as, for example dibenzoylperoxide, the crosslinking can also be initiated by heat. Heat crosslinking may be accomplished, for example, by using infrared radiation, conduction, and/or convection. Note that pressure in the direction of arrows 250a/ and 250b/ will continue to be applied to the body until the curing process is completed, thereby insuring proper electrical contact between the various layers of the body. The battery and frame may then be wrapped in tape if additional support is desired. Also note that, in the field of radiation curing, the terms curing, crosslinking, and polymerization are all used interchangeably. In addition, the terms oligomers and prepolymers may be used interchangeably.

The radiation curable material used in the present invention is a mixture of monomers and oligomers. Other additives are included in the mixture, if needed, for the mixture to cure properly. For example, where the curing process utilizes UV light, a photoinitiator is included in the radiation curable mixture.

As known to those skilled in the art, the terms "radiation curable plastic" and "radiation cured plastic" define a class of plastics which is structurally different from thermoplastic polymers such as polyethylene and/or polypropylene. For example, a frame made out of a thermoplastic polymer would be comprised of solidified macro-molecules physically entangled with each other to form a solid body. In contrast, a frame made out of a radiation cured plastic (as in the present invention) is, in effect, one big molecule which, on a macro level, is held together by chemical bonds, thereby forming a solid body. Because of these structural differences, the frame made out of the radiation cured plastic is able to withstand high temperatures without softening or melting, whereas the frame made out of the thermoplastic polymer would start to soften and/or melt at high temperatures, typically above 100 degrees celsius.

Formulations of the radiation curable mixture require a proportion of materials containing some degree of carbon-carbon double bonds or other reactive groups, such as, for example, epoxide, thiol, or thiolene. The unsaturated materials used for radiation induced free radical or cationic polymerization are mainly based on acrylate chemistry, but also methacrylates, epoxides, thiols, and thiolene compounds can be used. They are usually high viscosity macromolecules (resins) based on polyesters, urethanes (or polyurethanes), epoxies, or polyethers with one or more reactive groups attached. They will provide the product with the main mechanical and chemical properties. On the other hand, monomers, which are usually small ether, ester, or alkane based molecules with one or more reactive groups attached, are used to reduce the viscosity of the formulation in order to make it possible to process.

The radiation curable material is applied to the body sufficient to enable the cured frame to have the thickness of 0.1–10.0 millimeters, and more preferably 0.5–5.0 millimeters, depending on the size of the battery body. As illustrated in FIGS. 3A, 3B, 4A and 4B, a small portion of the coating will penetrate in between the cell layers. This is represented by extensions 201a/. The coating, which penetrates in between the layers, ensures that the layers are bonded together, and ensures that the anode layer remains in place. This penetration and bonding is a positive side effect of the frame formation. In addition, the technique of the present invention prevents deformation of the battery cell stack, especially at the edges, a problem which was discussed in the background of the invention.

In the embodiment shown in FIGS. 3B and 4B, the frame is applied to the battery stack in such a manner as to overlap the top and bottom portions of the stack at 225. Portions 225 help to maintain the compression of the stack layers. It should be noted however that alternate embodiments of the curable frame are envisioned where portions 225 are not included, as illustrated in FIGS. 3A and 3B.

The curable frame 201 may be either flexible or non-flexible, depending upon the radiation curable mixture used. An example of a radiation curable mixture which results in a hard and non-flexible frame is as follows:

| Compound | wt % |
| --- | --- |
| UCB Ebecryl 1608 Urethane hexaacrylate | 19.60 |
| UCB Ebecryl 220 Epoxy diacrylate | 20.33 |
| Henkel Photomer 4155 Triacrylate monomer | 40.53 |
| UCB Hdda Diacrylate monomer | 15.18 |
| Ciba Geigy Darocur 1173 Photoinitiator | 4.05 |

An example of a radiation curable mixture which provides a hard and flexible frame when cured is as follows:

| Compound | wt % |
| --- | --- |
| Akrcos SPO 23 Urethane diacrylate | 35.14 |
| UCB Ebecryl 220 Epoxy diacrylate | 10.86 |
| Henkel Photomer 4155 Triacrylate monomer | 1.93 |
| UCB Hdda Diacrylate monomer | 21.69 |
| UCB Ebecryl 169 Acrylated Adhesion promotor | 24.85 |
| Ciba Geigy Darocur 1173 Photoinitiator | 5.54 |

Both examples of radiation curable mixtures above may be cured using UV radiation.

The radiation cured frame of the present invention has several advantages over conventional stacked cell frames. First, the frame of the present invention is thinner than conventional stacked cell frames. Second, the frame of the present invention is easier and faster to manufacture than conventional stacked cell frames. Third, the frame of the present invention can be easily marked for identification purposes. Fourth, the frame of the present invention can be made to be any color (except for black when U.V. curing). Lastly, the frame of the present invention retains its shape even when exposed to high temperatures. In other words, the frame of the present invention will not soften or melt when exposed to high temperatures. In contrast, conventional frames begin to soften or melt when exposed to high temperatures, such as temperatures above 100 degrees celsius. This is due to the fact that conventional frames are made from a thermoplastic polymer which is comprised of solidified macro-molecules physically entangled with each other to form a solid body. When exposed to heat, however, the macromolecules begin to untangle and move, and the once solid body begins to soften and melt. Unlike conventional frames, the radiation cured frame of the present invention is made from a material comprising either a radiation cured polymer (for radiation curing), or a thermoset plastic (for heat curing). As discussed previously, this frame material is, in effect, one big molecule forming a solid body, and is able to withstand higher temperatures without softening or melting.

A final distinction worth mentioning is that the type of bonds -which secure the cured frame to the battery body are not the same type as those used in securing conventional frames to the battery body. For example, conventional frames typically utilize adhesive or chemical bonds to secure the frame to the battery body. In contrast, the frame of the present invention is secured to the battery body through physical bonds. These physical bonds are created as a result of the liquified curable mixture seeping into the porous regions of the battery body when the curable material is first applied onto the body. After the material is cured, the material within the porous regions of the body become trapped, forming a physical bond which secures the cured frame to the battery body. One advantage of this physical type bonding is that there is no chemical reaction with the contents of the battery body. This is desirable since chemical reactions with the battery body often degrade performance of the battery. If a stronger bond is desired, however, additional chemicals, such as, for example, acrylated phosphoric acid, may be added to the curable mixture in order to provide chemical bonding between the cured frame and the battery body.

EDGE SEALING OF ELECTROLYTIC CELLS TO RETARD DENDRITIC SHORT-CIRCUITS

FIGS. 3A, 3B, 4A, and 4B illustrate the edge sealing technique of the present invention. The illustration of FIGS. 3A and 3B represent a crosssectional view of a stacked single-cell rechargeable battery. The illustrations of FIG. 4A and 4B represent a cross-sectional view of a stacked bi-cell rechargeable battery. Although FIGS. 3A, 3B, 4A, and 4B depict a lithium-anode rechargeable battery, the technique of the present invention also applies to other rechargeable batteries such as, for example, Ni-Cd, zinc, and leadacid batteries.

Barrier portion 201 is made out of a radiation cured material or is made out of a synthetic or natural rubber such as, for example, EPDM rubber (ethylene/ propylene/diene termonomer) which is first dissolved in a low boiling alkane solvent (for example, pentane) and then applied directly onto the battery body (comprising layers 101, 102, 103 and 107). It should be noted that if barrier layer 201 is used as a frame, a radiation cured material is preferred, whereas either type of material may be used for retarding dendritic growths. A more detailed description of the technique for edge sealing the electrolytic cells to retard dendritic growths is discussed immediately below.

According to the one embodiment (FIGS. 3A, 3B, 4A, and 4B), layers 101, 102, 103 and 107 of the battery body are first stacked to form a single or bi-cell, as described in the background of the invention. Pressure is then applied perpendicularly to the battery layers, for example, along arrows 250a and 250b, to compress the layers together while, simultaneously, a mixture of radiation curable material or a mixture of EPDM rubber dissolved in a hexane or other low-boiling alkane solvent is applied to a portion of at least one outwardly exposed face of the body as indicated at 201 and 201a in FIGS. 3A, 3B, 4A, and 4B. The application of either mixture may be by spray, brush, roller coating, syringe, or by immersion.

The EPDM rubber solution should preferably be applied in a manner such that, after the solvent evaporates, a residue or thin film of EPDM rubber 201 is left which has a thickness of 0.1 millimeters or less. Similarly, the mixture of radiation curable material should preferably also be applied in a manner such that, after curing, a barrier layer 201 is formed which has a thickness of 0.1 millimeters or less.

After the EPDM mixture has been applied to the outwardly exposed faces of the battery, it is allowed to dry. As the solvent evaporates, a rubber residue 201 will be left along the outwardly exposed faces of the battery forming a physical barrier to the growth of metallic lithium dendrites, or other anode dendrites. Similarly, where a radiation curable layer material is applied to the outwardly exposed faces of the battery and then cured, a physical barrier to the growth of metallic lithium dendrites will be formed. The barrier will extend the cycle life of the battery since rechargeable batteries typically fail due to dendritic growth which eventually causes the short-circuiting of the battery.

While there are advantages in applying the EPDM solution or radiation curable mixture along the outwardly exposed faces of each of the cells of the battery stack, the retardation of dendritic growths can also be achieved when only the outwardly exposed faces of the anode layer are sealed by the rubber or radiation cured barrier. In either case, whether all the outwardly exposed faces or only the outwardly exposed anode faces of the battery stack are sealed, it is preferable for the barrier layer 201 to make direct intimate physical contact with the exposed face portion of the anode layer 101 within the battery body. This is represented in FIGS. 3A, 3B, 4A, and 4B by extensions 201a which make direct physical contact with the exposed face portions of the anode layer 101. This physical contact is desirable because dendritic growths typically originate from the anode and grow out towards the cathode or current collector edges. Thus, the physical barrier 201a along the anode face will retard dendritic growths from that face.

In an alternate embodiment, the rubber solution or radiation curable material can be applied to the individual cells of the battery stack before the layers are assembled together. Each of the coated cells can then be stacked on top of each other to form a rechargeable battery.

COMPOSITION OF BARRIER SOLUTION

As stated previously, the barrier 201 can be made from a radiation cured material or from a synthetic or natural rubber, either of which acts as a physical barrier to prevent anode dendritic growths. The composition of the radiation curable material has been described in detail in the previous section relating the radiation cured frame, and is equally applicable to this section as well. One skilled in the art, in light of the previous discussion, would understand how to form a radiation curable mixture for making barrier layer 201, and therefore a more detailed discussion will not be presented.

Barrier 201 may also be made from a synthetic or natural rubber. The rubber barrier solution is preferably made by dissolving EPDM rubber in hexane or cyclohexane or any other low-boiling alkane solvent which preferably evaporates quickly. Examples of such other solvents are benzene, toluene, pentane, and heptane.

In one embodiment, barrier 201 is made out of EPDM rubber. However, alternatives to EPDM may also be used for barrier 201 which accomplish the same function as the EPDM rubber barrier. Such alternative materials may be either dissolved polymers which are dissolved in a suitable solvent or curable prepolymers. For example, a radiation curable material such as Buta Diene Diacry10 late may be used to form barrier 201. The radiation curable material may be applied by either spray, brush, roller coating, emersion, or syringe, and then cured using some form of actinic radiation such as, for example, ultraviolet radiation or electron beam. Once the radiation curable material has cured, it will form a physical barrier which prevents dendritic growths from the anode.

Examples of radiation curable mixtures to be used to form barrier layer 201 are as follows:

| Material | Supplier | Quantity | Purpose |
| --- | --- | --- | --- |
| Poly BP 605 | Elf Atochem | 62.89% | Oligomer |
| Cyracure UVR 6128 | Union Carbide | 32.63% | Oligomer |
| FX512 | 3M | 3.98% | Photoinitiator |
| Fluorad FC430 | 3M | 0.50% | Surfactant |
| Poly BD 300 | Elf Atochem | 95.00% | Oligomer |
| Darocur 1173 | Ciba-Geigy | 5.00% | Photoinitiator |

Each of the examples above, when cured by UV radiation, will form a flexible resilient sealant having properties similar to rubber.

Another material which may be used for the barrier 201 is ethylene vinyl acetate.

In general, any material used to form barrier 201 should preferably be insoluble to any solvent system within the battery. Additionally, any material used should preferably be unreactive with the materials of the battery electrodes.

An example of a rubber barrier solution of EPDM rubber is 16% by weight EPDM and 84% hexane. The solution should preferably be non-electrically conductive. The particular type of EPDM preferred is 50% mooney viscosity EPDM.

Once the solution of EPDM rubber is made, it can then be applied to the outwardly exposed faces of a stack of electric cells. The solvent will evaporate leaving a tough, rubbery deposit 201 on and in between the outwardly exposed faces of adjacent layers of the cathode, electrolyte, and anode. Furthermore, because the barrier layer 201 is insoluble by the plasticizers present in the electrolyte, adverse transport of the lithium ions by the EPDM rubber will not occur, meaning that the growth of anode dendrites will be retarded.

OTHER ADVANTAGES OF BARRIER LAYER

The present invention extends cycle life of rechargeable battery because it retards failure mode due to dendritic growths which lead to short circuiting of the battery. Furthermore, the barrier layer of the present invention has several advantages in addition to the advantage of retarding dendritic growths which extend from the anode. For example, the barrier layer around the outwardly exposed faces of the battery stack will act as a protective shell or as an intermediate frame (depending on the thickness of the barrier layer) to hold each cell of the stack in place and to prevent each cell from slipping when handled. Since the preferred barrier layer is flexible, it is also advantageous in that it allows compression of the stack during battery assembly.

In addition, the application of the EPDM solution to the outwardly exposed faces of the battery stack allows for a portion of the solution to wick in between at least a portion of each of the cell layers. This wicking action results in a gradual boundary of EPDM residue being deposited in between each of the layers 101, 102, 103 near their respective edges. Such a gradual boundary of EPDM residue prevents inadvertent short circuiting of the anode laminate and cathode electrolyte layers. Conventionally, a mylar mask is deposited in between the anode assembly and cathode laminate layers to prevent inadvertent short circuiting between the two layers. However, because the gradual boundary of EPDM residue preforms the same function as the mylar mask, the mylar mask is no longer needed. Omitting the mylar mask, in turn, allows for a greater percentage of active service area between the anode assembly and cathode laminate layers, which results in increased cycle life, capacity, energy density, and rate capability of the rechargeable battery.

Additionally, the high current density areas which typically occur near the edges of the mylar mask in conventional batteries are reduced using the technique of the present invention. One explanation for this is that the gradual boundary of EPDM residue in between each of the cell layers of the battery allows for a gradual transition zone of limited ionic activity near this gradual boundary. In contrast, the edge of the mylar mask is very sharp and tends to cause highdensity current near its edges.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope or spirit of the invention as defined in the appended claims.

It is claimed:

1. A flat cell battery comprising: a body comprising a plurality of layers including:

at least one anode layer, said at least one anode layer including lithium or materials incorporating lithium.

at least one cathode layer, at least one electrolyte layer of solid material, said at least one electrolyte layer including a lithium salt, and a continuous radiation cured layer of material in contact with a portion of at least one outwardly exposed face of said body, said cured layer of material being positioned relative to said body such that the cured layer inhibits formation of short circuiting electrical paths between said anode and cathode layers, said paths being caused by formation of dendritic growths extending out from said anode layer towards said cathode layer;

said cured layer of material further being positioned relative to said body such that the cured layer forms a unitary frame which provides support to said body in a manner to secure in place relative positions of said plurality of layers.

2. The battery of claim 1 wherein said cured layer of material includes a mixture comprising either a radiation cured plastic or a thermoset plastic.

3. The battery of claim 1 wherein said cured layer includes a plurality of extensions which penetrate in between at least a portion of said plurality of layers.

4. The battery of claim 1 wherein said cured layer is flexible.

5. The battery of claim 1 wherein said cured layer is non-flexible.

6. The battery of claim 1 wherein said cured layer is in physical contact with a portion of at least one outwardly exposed face of said at least one anode layer.

7. The battery of claim 1 wherein said battery is devoid of a Mylar masking material, and wherein said cured layer penetrates in between at least a portion of said plurality of layers to form a gradual boundary between each of said layers, thereby establishing a transition zone for limited ionic activity.

8. The battery of claim 2 wherein said mixture is selected from the group having chemically active bonds consisting of:

material comprising carbon-carbon double bonds, material comprising epoxide, material comprising thiol, and material comprising thiolene.

9. The battery of claim 2 wherein said mixture is selected from the group consisting of monomers and oligomers.

10. The battery of claim 1 further comprising physical bonds which secure said cured layer to said body.

11. The battery of claim 1 wherein said unitary frame is sufficiently strong such that when pressure is applied on said frame, the edges of said plurality of layers will not be deformed.

12. The battery of claim 1 wherein said unitary frame has a thickness of 0.1–10 millimeters.

13. A flat cell battery comprising:

a body comprising a plurality of layers including:

at least one anode layer, said at least one anode layer including lithium or materials incorporating lithium, at least one cathode layer, at least one electrolyte layer or solid material, said at least one electrolyte layer including a lithium salt, and a unitary, cured frame, made from a mixture comprised of either a radiation cured plastic or a thermoset plastic, encasing a portion of said body such that said frame provides support to said body in a manner to secure in place relative positions of said plurality of layers;

said unitary frame including a plurality of extensions which penetrate in between at least a portion of said plurality of layers for inhibiting formation of dendritic growths between anode and cathode layers of said battery;

said unitary frame formed from a material that substantially inhibits formation of short circuiting dendritic growth between said anode and cathode layers.

14. The battery of claim 13 further comprising physical bonds which secure said cured frame to said body.

15. The battery of claim 13 wherein said unitary frame is sufficiently strong such that when pressure is applied on said frame, the edges of said plurality of layers will not be deformed.

16. The battery of claim 13 wherein said unitary frame has a thickness of 0.1–10 millimeters.

17. A rechargeable battery comprising:

a body comprising a plurality of layers including:

at least one anode layer, said at least one anode layer including lithium or materials incorporating lithium, at least one cathode layer, and at least one electrolyte layer of a solid material, said at least one electrolyte layer including a lithium salt, and a continuous barrier in contact with at least a portion of an outwardly exposed face of said body, said barrier layer being positioned so as to inhibit short circuiting electrical paths between said anode and cathode layers, said paths being caused by formation of dendritic growths extending out from said anode layer towards said cathode layer;

said barrier further being positioned relative to said body such that the barrier forms a unitary frame which provides support to said body in a manner to secure in place relative positions of said plurality of layers.

18. The battery of claim 17 wherein said barrier is made from a mixture comprised of either a synthetic rubber or a natural rubber.

19. The battery of claim 18 wherein said mixture comprises EPDM rubber.

20. The battery of claim 17 wherein said barrier is made from a radiation curable material.

21. The battery of claim 17 wherein said barrier is made from a material which is non-electrically conductive, and which is chemically inert to all materials which form said plurality of layers.

22. The battery of claim 17 wherein said barrier material is selected from the group consisting of:

synthetic rubbers, natural rubbers, buta diene diacrylate, and ethylene vinyl acetate.

23. The battery of claim 17 wherein said barrier comprises a plurality of extensions which penetrate in between at least a portion of said plurality of layers.

24. The battery of claim 17 wherein said barrier is in physical contact with a portion of at least one outwardly exposed face of said at least one anode layer.

25. The battery of claim 17 wherein said barrier is flexible.

26. The battery of claim 17 wherein said battery is devoid of a Mylar masking material, and wherein said barrier penetrates in between at least a portion of said plurality of layers to form a gradual boundary between each of said layers, thereby establishing a transition zone for limited ionic activity.

27. The battery of claim 17 wherein said unitary frame is sufficiently strong such that when pressure is applied on said frame, the edges of said plurality of layers will not be deformed.

28. The battery of claim 17 wherein said unitary frame has a thickness of 0.1–10 millimeters.

* * * * *

UNITED STATES PATENT AND TRADEMARK OFFICE
CERTIFICATE OF CORRECTION

PATENT NO. : 5,770,331
DATED : June 23, 1998
INVENTOR(S) : Ib I. Olsen et al.

It is certified that error appears in the above-indentified patent and that said Letters Patent is hereby corrected as shown below:

Title page, item
    [22], Filing Date, line 1

Replace:    "Sep. 20, 1996"

With:     --September 30, 1996--

Signed and Sealed this

Fifth Day of September, 2000

Attest:

Q. TODD DICKINSON

*Attesting Officer*     *Director of Patents and Trademarks*